Oct. 17, 1944.  F. KUHN ET AL  2,360,691
ELECTRICALLY HEATED GLUE POT
Filed Nov. 2, 1942
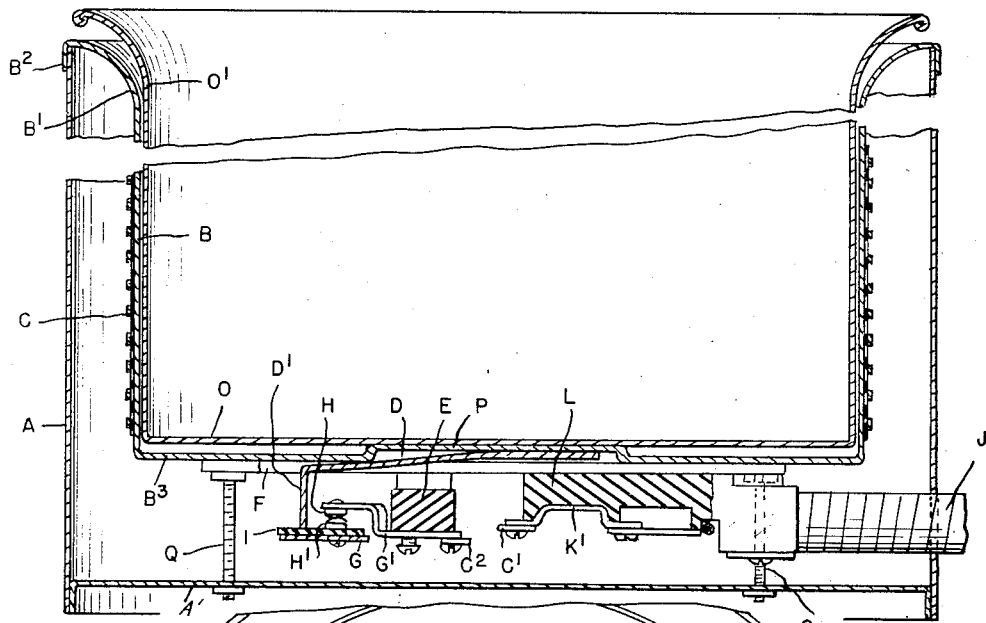
FIG.1.
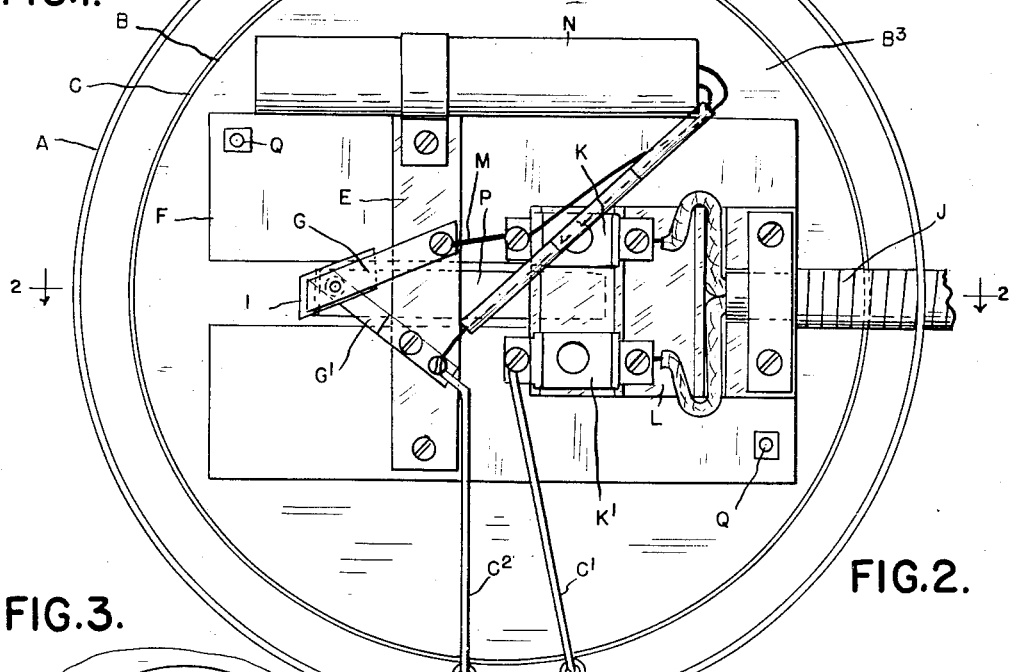
FIG.2.
FIG.3.
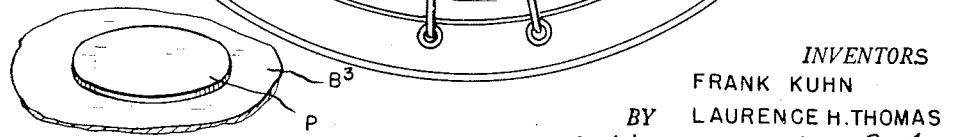
INVENTORS
FRANK KUHN
BY  LAURENCE H. THOMAS
*Whittemore Hulbert & Belknap*
ATTORNEYS Patented Oct. 17, 1944

2,360,691

UNITED STATES PATENT OFFICE 2,360,691

ELECTRICALLY HEATED GLUE POT

Frank Kuhn, Detroit, and Laurence H. Thomas, Birmingham, Mich., assignors to American Electrical Heater Company, Detroit, Mich., a corporation of Michigan Application November 2, 1942, Serial No. 464,240

7 Claims. (Cl. 219—43)

The invention relates to electrically heated vessels more particularly designed for holding glue, or the like, and it is the object of the invention to obtain a construction having certain advantages, as hereinafter set forth.

In the heating of glue, it is important to maintain a substantially constant temperature. Where the heating is electrically generated there is danger of accumulation of heat which might result in the burning of the material and it is, therefore, one of the features of my invention to obtain a construction which avoids such result. It is also advantageous to have a glue pot which can be carried around the work to the most convenient points for application. However, if the pot is electrically heated, the service connections interfere with such portability. If the pot is provided with a removable containter for the glue this is likely to interfere with thermal conductivity particularly between the removable container for the material and the thermostatic control.

In view of conditions just described, we have devised, first, a construction of electrically heated pot provided with a thermostatic control for the heating element and, second, a pot of such character provided with a removable container together with means for insuring quick response by the thermostat to the temperature of the contents of this container. To this end, the invention consists in the construtcion as hereinafter set forth.

In the drawing:

Figure 1 is a vertical central section on line 2—2 of Figure 2;

Figure 2 is a sectional bottom plan view; and

Figure 3 is a fragmentary perspective view showing the limited area supporting contact for the removable container.

A is an outer casing, preferably of cylindrical form, and B is an inner casing forming in connection with the member A the hollow wall vessel. The member B is provided at its upper end with a flaring mouth B' and a down-turned flange $B^2$ for overlapping the upper edge of the casing A. The bottom $B^3$ of the member B is spaced from the bottom A' of the casing A to provide room for the thermostatic controls and electrical connections. C is the electrical heating unit, preferably a helical coil, wound about the lower portion of the member B. The thermostatic switch assembly is mounted on the bottom $B^3$ of the member B and comprises a bimetal, or other warpable thermostatic bar D, one end of which is welded or otherwise secured to said bottom. E is an insulator bar secured to a plate F beneath the bottom $B^3$. G and G' are flexible conductor members mounted on the insulator bar E and extending obliquely therefrom into overlapping relation to each other. H and H' are contact members on the members G and G' which are normally in contact with each other. The thermostatic bar D has a down-turned end portion D' bearing against an insulator I on the member G. This operates when the bar D is warped to move the member G downward, thereby separating the contacts H and H' from each other. Current is supplied through conductors in a flexible armour tube J to terminals K and K' on an insulator block L. One of these terminals is connected to one end of the resistor C' in the heating unit C and the other is connected through the conductor M to the member G. The member G' is connected to the opposite end portion $C^2$ of the resistor in the heating unit C. N is a condenser which is connected between the members G and G' to protect the contacts H and H'.

With the construction as thus far described, the thermostatic switch or contact breaker will respond to heat in the bottom $B^3$ of the member B. It is, however, desirable that the response of the thermostat should be to the temperature of the glue or other content of the vessel and if the vessel is provided with a removable container, thermal conductivity may be interfered with. Thus, any warping or distortion in shape of the inner container might separate the same from a portion of the bottom $B^3$ to which the bar D is attached. To avoid such defect, we have provided a limited area of contact between the bottom $B^3$ and the bottom O of the removable inner container O'. Preferably this is secured by forming a central boss or struck-out portion P on the bottom $B^3$ which centrally contacts with the bottom O of the container. The thermostatic bar D is secured to the under side of this boss P and, therefore, receives heat directly therefrom and from the bottom O resting thereupon. Consequently, the temperature of these parts will be very close to that of the contents of the container O'. Also, the fact that the boss P is at the center of the bottom $B^3$ where it is farthest removed from the heating unit C will avoid direct response to heat generated in said unit.

The construction is one which is simple to manufacture and can be easily assembled. All of the electrical parts can be mounted on the bottom of the member B before the latter is inserted within the casing A. As the member B is suspended from the upper end of the casing A, these electrical parts are held free from contact with any portion of the outer casing. Bolts Q may be used to hold the members B and A together.

What we claim as our invention is:

1. An electrically heated vessel comprising an outer casing and a removable container therewithin, an electrical heating unit applied to said outer casing, a support for said inner container on said casing having a contact area substantially less than the bottom area of said container, and a thermostatic control for said heating unit thermally connected directly to said limited area contact to respond to the heat from within said removable container conducted through said limited area contact.

2. An electrically heated vessel comprising an outer casing having hollow walls, a heating unit applied to the inner portion of said hollow wall, a removable inner container, a support for said inner container on said outer casing having a contact area substantially less than the bottom area of said container, and a thermostatic control for said heating unit thermally connected directly to said limited area support to respond to the heat from within said removable container conducted through said limited area contact.

3. An electrically heated vessel comprising a casing having an outer wall and an inner wall spaced therefrom and supported from the upper end of said outer wall, said inner wall having a bottom portion spaced above the lower end of said outer wall, an electrical heating unit surrounding said inner wall, a removable container within said casing, a raised boss arranged centrally of the bottom of said inner wall forming a supporting contact for said container, and a thermostatic switch assembly mounted on the lower face of said bottom to be suspended therefrom and controlling said electrical heating unit, said assembly including a warpable thermostatic bar thermally connected to said boss to respond directly to the heat thereof.

4. An electrically heated vessel comprising an outer casing having hollow walls and a hollow bottom, an electrical heating unit surrounding the inner portion of said hollow wall, a boss projecting upward centrally of the inner portion of said hollow bottom, a removable container within said hollow casing resting upon said boss to form good thermal contact therewith, and a thermostatic switch unit arranged within said hollow bottom and suspended from the inner portion thereof, said unit controlling said electrical heating unit and including a warpable thermostatic bar secured to said boss to respond to the temperature thereof.

5. An electrically heated vessel comprising a casing having spaced outer and inner walls and bottoms, an electrical heating unit surrounding the inner wall a boss projecting upwardly from the inner portion of said hollow bottom, and a thermostatic control for said unit mounted beneath the inner bottom, said unit including a warpable thermostatic bar having one end welded to the bottom of said boss to respond directly to the heat thereof.

6. An electrically heated glue pot comprising a casing having side walls and a bottom, an electrical heating unit surrounding said walls, a removable receptacle for the glue closely fitting within said side walls and resting directly on a portion of said bottom having an area of contact substantially less than the total area of said bottom and a thermostatic control for said heating unit having a warpable thermostatic member in direct thermal contact with said bottom in registration with said limited area of contact.

7. An electrically heated glue pot comprising a casing having side walls and a bottom, an electrical heating unit surrounding said side walls, a boss of small area projecting upwardly from said bottom, a removable receptacle for the glue closely fitting within said side walls and resting on said boss and a thermostatic control for said heating unit having a warpable thermostatic member in direct thermal contact with the bottom of said boss.

FRANK KUHN.
LAURENCE H. THOMAS.